Jan. 3, 1967     J. R. DAVY ETAL     3,296,049
METHOD FOR MAKING GLASS SANDWICHES PRIMARILY
FOR WINDOWS OF OPTICAL INSTRUMENTS
Original Filed Nov. 4, 1960
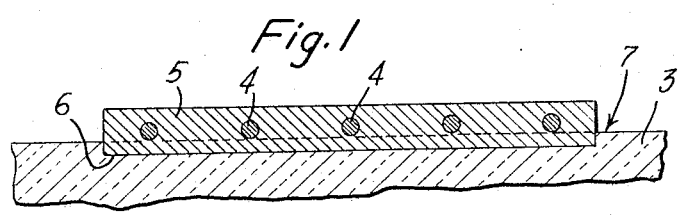
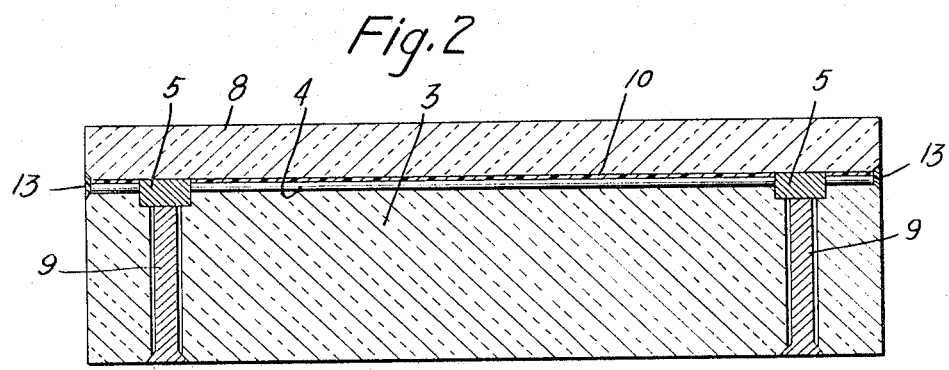
INVENTORS
JOHN RUPERT DAVY &
ALEXANDER J. N. HOPE
BY Mason, Fenwick & Lawrence
ATTORNEYS

3,296,049
METHOD FOR MAKING GLASS SANDWICHES PRIMARILY FOR WINDOWS OF OPTICAL INSTRUMENTS
John R. Davy and Alexander J. N. Hope, Anniesland, Glasgow, Scotland, assignors to Barr and Stroud Limited, Glasgow, Scotland, a British company
Original application Nov. 4, 1960, Ser. No. 67,435, now Patent No. 3,223,829, dated Dec. 14, 1965. Divided and this application May 4, 1965, Ser. No. 453,148
3 Claims. (Cl. 156—99)

This application is a division of pending application, Serial No. 67,435, filed November 4, 1960, now U.S. Patent No. 3,223,829.

This invention relates to a glass sandwich primarily but not exclusively for windows for optical instruments involving optical magnification, and of the type in which the sandwich is heated by fine electrically energized elements or wires.

Such glass sandwiches normally comprise glass sheets separated by a transparent cement in which are embedded fine high resistance electrical heating wires, for example the diameter of the wire may be 0.0005 inch or one two-thousandths part of an inch. A glass sandwich of this type is described in our concurrent patent application No. 781,412, filed December 18, 1958, now Patent No. 3,111,570. Such heating wires and their contacts are frequently subjected to the effects of switching on and off the electric heating current, and it is important, especially for example for use in aircraft flying in very low temperature atmospheres, that there should be efficient heating over the whole surface of the sandwich, that is to say there should be no electrical failures, and moreover the sandwich should be able to stand up to the alternate heating and cooling effects for the life of the body in which it is fitted, such as aircraft, or possibly a seagoing craft, or road vehicle.

Hitherto, a number of methods have been proposed for leading in the electrical current to the fine resistance wires. For example by pressing the wires between solid metal strips or bus-bars. This involves relatively small areas of contact between the bus-bars and the wires which may, in extreme cases, result in deterioration at such contacts. Another method is to position the wire between two tinned metal strips which are subjected to heat and pressure in order to fuse the union; this may result in poor contact because (a) it is extremely difficult to use high uniform pressures to clamp the strips together without nipping the fine wires, (b) soft solder does not adhere readily to the metal of the resistance wires, (c) the tinned strips do not tin together easily without the use of flux. The flux is undesirable in contact with optical surfaces which cannot later be cleaned because of the fine resistance wires lying across such surfaces.

A further method is to position the fine wires on a lower metal strip and tin over the upper surface of the wires so as to unite them to the lower strip; this too, is difficult without the use of a flux, and may result in high spots where the soft solder has a thickness which results in separation of the glass sheets of the sandwich to an undesirable degree.

According to the invention we provide a glass sandwich primarily for optical instruments involving optical magnification, comprising glass sheets between which are positioned a series of fine electrically conductive elements connected to a bus-bar, in which the bus-bar is formed from a colloidal dispersion of electrically conductive material in which the element ends are embedded, said material after solidification completely surrounding the element ends in situ.

Preferably the colloidal dispersion is a metal dispersion.

An embodiment of the invention will now be described simply by way of example with reference to the accompanying drawings in which:

FIG. 1 is a diagrammatic vertical section through part of a glass sandwich illustrating the method of manufacture, FIG. 2 is a vertical section through the complete glass sandwich, but in a plane at right angles to FIG. 1, and to a reduced scale.

The thicknesses in both figures are shown to a greatly enlarged scale for clearness.

Referring to FIG. 1, the lower glass layer or substrate of the glass sandwich is shown at 3, and the fine electrical resistance wires at 4. These wires may for example be of the order of 0.0005 inch diameter. The bus-bar electrically connecting these element ends is indicated at 5.

A channel 6 is machined, etched or otherwise produced in the surface of the subtrate 3. This channel is filled with electrically conducting material which in this example is a colloidal dispersion of silver and an organic binding agent or cement in alcohol known in the trade as "Dag Dispersion 962" (Acheson Colloids Limited, Prince Rock, Plymouth), in liquid suspension form. This is baked to remove solvent and the material then solidifies to form a bus-bar of silver and the organic binding agent or cement, which bus-bar is worked flat with the upper surface 7 of substrate 3.

The electric wires 4 are then arranged sinuously over the glass surface, and the element ends lie on the upper surface of the bus-bar material in the channel. The upper part of the bus-bar mtaerial is then applied over the top of the element ends, for example by spraying the aforesaid colloidal dispersion through a mask, or lightly brushing same, or by dipping or by any other convenient method. This material unites in situ with the material already in the channel 6 thus forming a bus-bar in which the element ends are embedded in unitary manner.

The depth of the upper coating or bus-bar material may be varied as desired, and in the drawing this is shown of appreciable depth and of rectangular shape when combined with the lower material. We have found, however, that one brush application of the material embeds the resistance wires sufficiently to a depth below the surface of the material not less than the diameter of the wire used, e.g. 0.0005 inch as aforesaid.

We have found that a bus-bar of this nature when united with the resistance wires is capable of carrying a current of 900 amps per square inch in satisfactory manner.

It will be evident that complete contact between the wires and the bus-bar is effected, so that the contact area is large, and the possibilities of deterioration of contact are greatly reduced, while the optical properties of the sandwich are not adversely affected.

After formation of the bus-bar joint as aforesaid, the upper glass layer 8 of the sandwich is applied, and the whole is finally cemented in position, for example as set forth in our aforesaid patent application No. 781,412, now Patent No. 3,111,570, utilizing a thermo-setting epoxy synthetic resin as the cement between the upper and lower glass layers.

We may utilize a method of thermostatic control of the heating elements by employing the amplified signal from a temperature-sensitive resistance wire to operate the load carrying circuit. The said wire may be in the same plane as the heating elements and parallel to them. Alternatively, the said wire may be in a different plane from the heating elements, electrically insulated from them and disposed otherwise than parallel to the heating elements. Contacts may be made between this temperature-sensitive wire and appropriate terminals by means of colloidal silver or other electrically conductive material as aforesaid.

As shown in FIG. 2 the substrate 3 and the upper glass layer 8 enclose the two bus-bars 5 and the wires 4, the parts being secured together by an expoxy synthetic resin cement 10, the projecting wire ends being cut off and re-entrant grooves 13 at the ends filled with cement and the bus-bars 5 being connected to stud terminals 9 through which the electrical supply is led. The said epoxy synthetic resin cement may be, for example, "Epikote 815" (an epoxide resin based on the condensation product of a polyfunctional halohydrin and a polyhydric phenol with an aliphatic ether diluent, the whole having an epoxide equivalent of 175–210, by Shell Chemicals Ltd.), and a hardener may be added such as K61B (the tri-2-ethyl hexoate of 2:4:6-tris(dimethylaminomethyl) phenol, by Anchor Chemicals Ltd.).

We claim:
1. A method of connection between the fine electric wires and a bus-bar of an electrically heatable glass sandwich primarily for optical instruments wherein such fine electric wires are arranged in a selected pattern of plural wire lengths spaced over a surface of one of the glass layers of the sandwich to heat the glass layers, comprising embedding the wire ends in an electrically conductive material and an organic binding agent in the liquid suspension state arranged to form a bus-bar for said wires, and solidifying the material and organic binding agent in order to fix the wire ends therein.

2. A method of connection between the fine electric elements and a bus-bar of an electrically heatable glass sandwich primarily for optical instruments, comprising embedding the element ends in an electrically conductive material and an organic binding agent in the liquid suspension state and solidifying the material and organic binding agent in order to fix the element ends therein, the conductive material and organic binding agent being applied firstly in liquid suspension state to fill a channel below the element ends, and thereafter further conductive material and organic binding agent in liquid suspension state being applied over the upper surface of the ends, so as to unite in situ with the rest of the conductive material and binding agent thereby embedding the element ends.

3. A method of connection between the fine electric elements and a bus-bar of an electrically heatable glass sandwich primarily for optical instruments, comprising filling channels located in at least one of the glass layers of the sandwich with an electrically conductive material and an organic binding agent in the liquid suspension state, embedding the element ends in said electrically conductive material and organic binding agent and solidifying the material and binding agent in order to fix the elements therein.

References Cited by the Examiner

UNITED STATES PATENTS

| | | | |
|---|---|---|---|
| Re. 25,711 | 1/1965 | Gaiser | 156—102 X |
| 2,440,691 | 5/1948 | Jira | 117—227 X |
| 2,470,509 | 5/1949 | Marini | 156—102 |
| 2,592,601 | 4/1952 | Raymond et al. | 156—99 X |
| 2,831,792 | 4/1958 | Gaiser | 156—104 |
| 3,063,881 | 11/1962 | Harwig | 156—99 |

FOREIGN PATENTS 215,480  6/1957  Australia.

EARL M. BERGERT, *Primary Examiner.*

HAROLD ANSHER, *Assistant Examiner.*